(12) United States Patent
Calve

(10) Patent No.: US 6,591,955 B2
(45) Date of Patent: Jul. 15, 2003

(54) FREEWHEEL DEVICE

(75) Inventor: Marc Le Calve, Cerelles (FR)

(73) Assignee: Aktiebolaget SKF, Gothenburg (SE)

( * ) Notice: Subject to any disclaimer, the term of this patent is extended or adjusted under 35 U.S.C. 154(b) by 0 days.

(21) Appl. No.: 09/984,308

(22) Filed: Oct. 29, 2001

(65) Prior Publication Data

US 2002/0050433 A1 May 2, 2002

(30) Foreign Application Priority Data

Oct. 30, 2000 (FR) .............................. 00 13498

(51) Int. Cl.$^7$ ................................. F16D 41/07
(52) U.S. Cl. ..................... 192/45.1; 192/41 A
(58) Field of Search ................. 192/45.1, 41 A, 192/41 R

(56) References Cited

U.S. PATENT DOCUMENTS

| 4,252,221 A | 2/1981 | Lanzerath et al. ............ 192/41 |
| 4,928,801 A | 5/1990 | Laurent ...................... 192/45.1 |
| 5,480,013 A | 1/1996 | Fujiwara et al. ............ 192/45.1 |
| 5,603,532 A | 2/1997 | Guest ......................... 285/305 |
| 6,138,805 A | * 10/2000 | Kinoshita .................. 192/45.1 |

FOREIGN PATENT DOCUMENTS

| EP | 0 664 405 | 7/1995 |
| EP | 0 641 948 | 8/1995 |
| FR | 2 474 121 | 7/1981 |
| JP | 11-182588 | * 6/1999 |

* cited by examiner

Primary Examiner—Saul Rodriguez
(74) Attorney, Agent, or Firm—Smith, Gambrell & Russell

(57) ABSTRACT

A freewheel device includes at least one cage, a plurality of wedging members retained by the cage, and a member having a cylindrical surface which comes into contact with the cage. The cage has an axial portion provided with windows which receive immobilizing members and at least one generally annular and substantially radial portion having a flexing area and a plurality of tongues which are of substantially radial shape in a relaxed state and which flex in an axial direction so that ends of the tongues are in frictional contact with the cylindrical surface so that they are circumferentially and axially connected to the surface.

11 Claims, 3 Drawing Sheets

FREEWHEEL DEVICE

BACKGROUND OF THE INVENTION

1. Field of the Invention

The present invention concerns freewheel devices.

2. Description of the Prior Art

Freewheel devices generally include an outer ring provided with a cylindrical inner slideway for cams of the freewheel, an inner ring or a shaft provided with a cylindrical outer slideway for said cams of the freewheel, and a freewheel disposed between the slideway of the outer ring and the slideway of the inner ring or shaft.

The freewheel includes a single cage or a double cage consisting of two concentric cages, provided with windows in which are disposed cams which provide a unidirectional coupling between the outer and inner rings by being wedged or by sliding between the two slideways.

The cage generally has a radial flank imparting sufficient rigidity to the cage on at least one side.

The freewheel is therefore able to transmit a torque between the outer and inner rings in one direction and to allow free rotation in the other direction.

To encourage tilting of the cams in the wedging direction, a spring can be provided in the form of a strip exerting on each cam a return torque tending to hold the cams at all times in contact with the slideways.

These freewheel devices are used in automobile automatic transmissions in particular.

To improve the working of freewheel devices and/or to facilitate their assembly, devices for frictionally linking the outer ring of the freewheel and the cage have been envisaged.

The documents FR-A-2 474 121 and EP-A-0 641 948 disclose radially elastic members cut out from the cage and coming into contact with the bore of the outer ring. These devices operate satisfactorily. However, according to the document FR-A-2 474 121, bent strips are used, which must therefore be bent, which is a supplementary operation of non-negligible cost. The strips, because of their small section, are also relatively sensitive to impact, which necessitates a few precautions in connection with packaging and handling them.

The cage according to the document EP-A-0 641 948 necessitates a cutting operation on elastic parts which must be performed as a final reworking of the cage when it has already been formed to shape, which increases manufacturing time and leads to a relatively high manufacturing cost. Also, some portions of the cage, especially in the cylindrical part provided with the cam cells, are deformed and the overall rigidity of the cage is degraded, which can compromise correct working of the freewheel in some circumstances.

The present invention proposes to solve the problems referred to above.

The present invention proposes an economic and reliable freewheel device provided with a cage enabling easy fitting of the freewheel between the slideways and holding the freewheel effectively in that position.

SUMMARY OF THE INVENTION

The invention therefore proposes a freewheel device including at least one cage, a plurality of wedging members retained by the cage, and a member having a cylindrical surface adapted to come into contact with the cage, which has an axial portion provided with windows adapted to receive immobilizing members and at least one generally annular and substantially radial portion having a flexing area and a plurality of tongues of substantially radial shape in a relaxed state and adapted to flex in an axial direction so that ends of the tongues are in frictional contact with the cylindrical surface so that they are circumferentially and axially connected to the surface.

In one embodiment of the invention the flexing area is thinner than the remainder of the substantially radial portion.

The flexing area can be near the axial portion, i.e. nearer the axial portion than the free ends of the tongues. The flexing area can be in the immediate vicinity of the axial portion in the radial direction.

The flexing area can be radially between the ends of the tongues and the axial part.

The tongues can be generally trapezoidal. The cage can be made from sheet-metal, for example from steel plate.

In one embodiment of the invention the cage has an L-shaped section with an axial portion and a radial portion.

In another embodiment of the invention the cage has a U-shaped section with an axial portion and two radial portions. One radial portion can have a supplementary portion. Both radial portions could have a supplementary portion.

The freewheel can further include a spring to encourage tilting of the wedging members.

The member is advantageously a bore of an outer ring or an outside surface of an inner ring or a shaft.

The tongues can be oblique when mounted.

The tongues preferably prohibit by means of wedging effect axial movement in at least one direction relative to the member having a cylindrical surface in contact with the cage.

The member advantageously has a bevel at one end of the cylindrical surface. The bevel facilitates mounting the cage on the cylindrical surface.

In one embodiment the member has a shoulder at the other end of the cylindrical surface to form an axial abutment for the cage which is therefore retained in one direction by the axial abutment and in the other direction by friction between the free ends of the tongues on the cylindrical surface and the wedging effect of said supplementary portion.

The invention also proposes a method of manufacturing a freewheel cage, wherein the flexing area is formed at the same time as the substantially radial portion.

The flexing area and the substantially radial portion are advantageously formed in the same operation.

Thus the cage is provided with means providing a circumferential and axial friction connection with one of the rings of the freewheel. Those means prevent axial movement of the cage relative to the ring during assembly.

The invention will be better understood after studying the following detailed description of a few embodiments of the invention, given by way of non-limiting example only and shown in the accompanying drawings.

DETAILED DESCRIPTION OF THE PREFERRED EMBODIMENT

Figure 1:
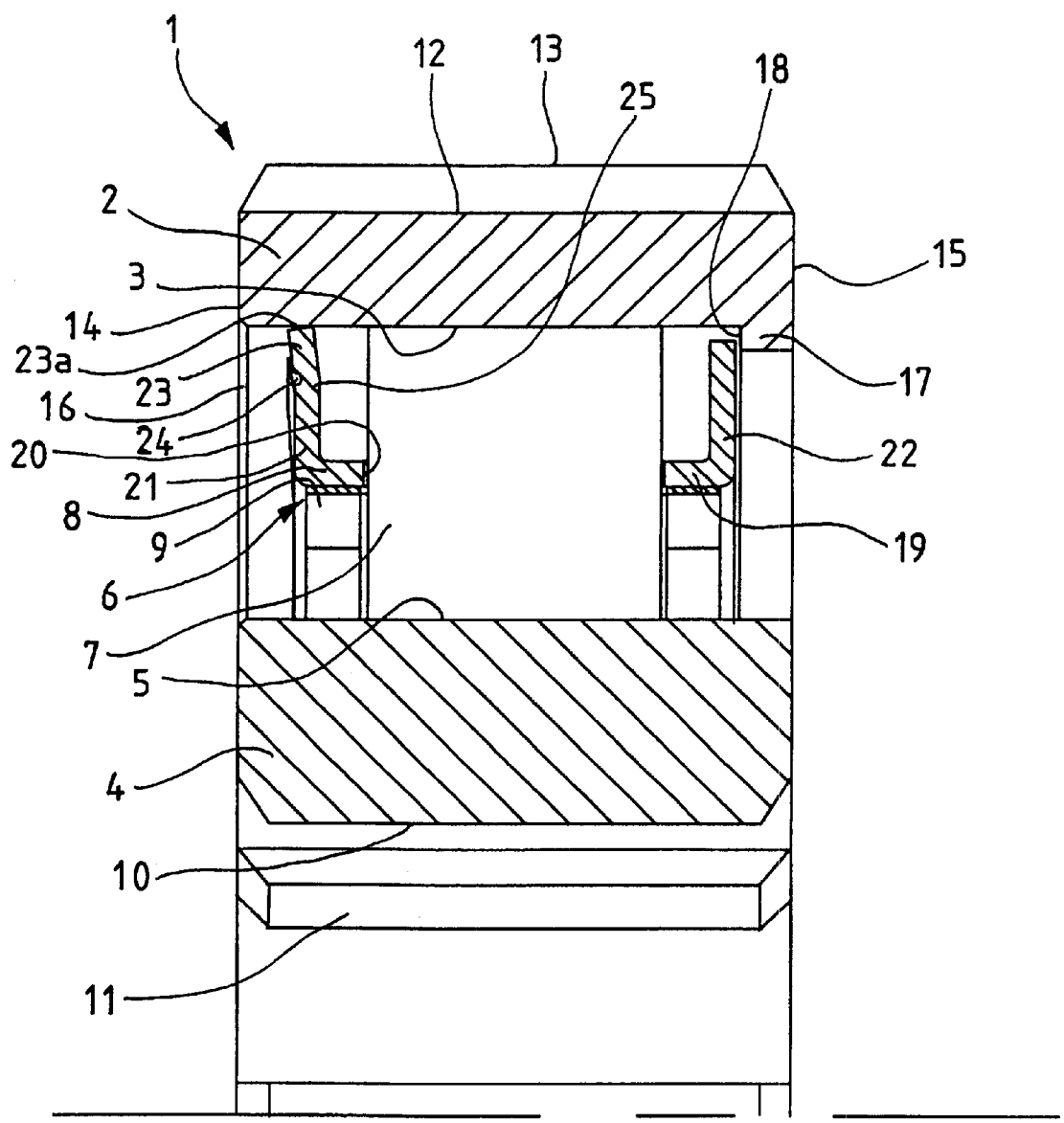
FIG. 1 is a half-view in axial section of a freewheel device in accordance with one aspect of the invention.

As can be seen in FIG. 1, the freewheel device 1 has an outer ring 2 with a slideway 3 on the inside surface of its bore, an inner ring 4 with a slideway 5 on its cylindrical outside surface, and a freewheel 6 disposed between the slideway 3 on the inside surface of the outer ring 2 and the slideway 5 on the outside surface of the inner ring 4. The freewheel 6 includes a row of cams 7 retained by a cage 8 and a spring 9 in the form of a strip for tilting the cam 7 in the wedging direction which wedges the cams 7 between the outer slideway 3 and the inner slideway 5.

On the inside surface of its bore 10 the inner ring 4 has a plurality of teeth 11 which are regularly spaced in the circumferential direction and are intended to transmit a torque to a member represented as a mechanical member, on which the inner ring 4 can be mounted. Similarly, the outer ring 2 has on its outside cylindrical surface 12 a plurality of teeth 13 cooperating, in order to transmit a torque, with a mechanical member, not shown, in which the outer ring 2 could be mounted. The teeth 13 are formed across the entire axial width of the outer ring 2.

To be more precise, the outer ring 2 has two radial surfaces 14 and 15. On the same side as the surface 14, the slideway 3, which is formed by a cylindrical surface, is extended beyond the area in which the cams 7 come into contact and as far as a bevel 16 connecting with the front surface 14. On the same side as the surface 15, a shoulder 17 delimits the cylindrical surface of the slideway 3. The shoulder 17 has a diameter smaller than that of the slideway 3. The shoulder 17 forms an annular radial surface 18 joined to the cylindrical surface of the slideway 3.

The cage 8 is generally annular and has an axial portion 19 in which windows 20 are formed. The cams 7 are mounted and regularly distributed in the windows 20. The spring 9 can be in contact bearing engagement with the axial portion 19. The cage 8 also has a substantially radial portion 21 disposed at the free end of the axial portion on the same side as the surface 14 and a radial portion 22 on the opposite side. The radial portion 22 extends toward the outer ring 2 and has an outside diameter greater than that of the shoulder 17. The radial portion 22 can therefore come into abutting contact engagement with the radial surface 18 and cannot pass beyond the shoulder 17 in normal use.

The substantially radial portion 21 includes an annular base area 21a near the axial part 19 and an end area cut into tongues 23 in the direction of the outer ring 2 which, in the assembled state shown in FIG. 1, assumes a slightly flexed, in other words oblique shape, the free ends 23a of the tongues 23 being oriented slightly toward the surface 14. The free ends 23a are in contact with the bore of the outer ring 2, i.e. with a cylindrical surface extending the slideway 3.

A circular groove 24 concentric with the cage 8 is formed in the substantially radial portion 21 and defines an area 25 of reduced thickness, also referred to as a "flexing area". The flexing area 25 allows the tongues 23 to become slightly inclined relative to a radial plane, by deforming elastically. However, the deformation could be partly plastic.

The circular groove 24 is at a radial distance from the free end 23a and a radial distance from the axial portion 19. A circular groove could also be provided in the immediate vicinity of the axial portion 19, the substantially radial portion 21 being divided into tongues over the whole of its length in the radial direction.

Figure 2:
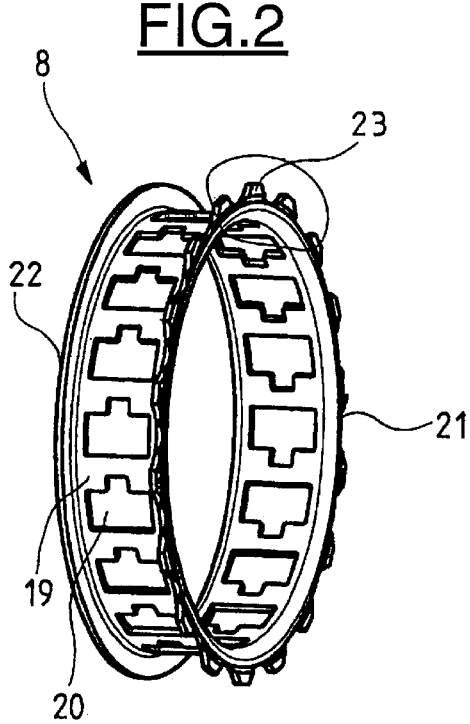
FIG. 2 is a perspective view of the cage of the freewheel from FIG. 1.
Figure 3:
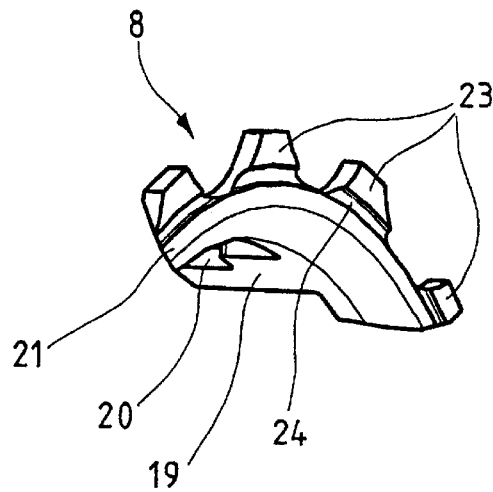
FIGS. 3 and 4 show details of FIG. 2.
Figure 4:
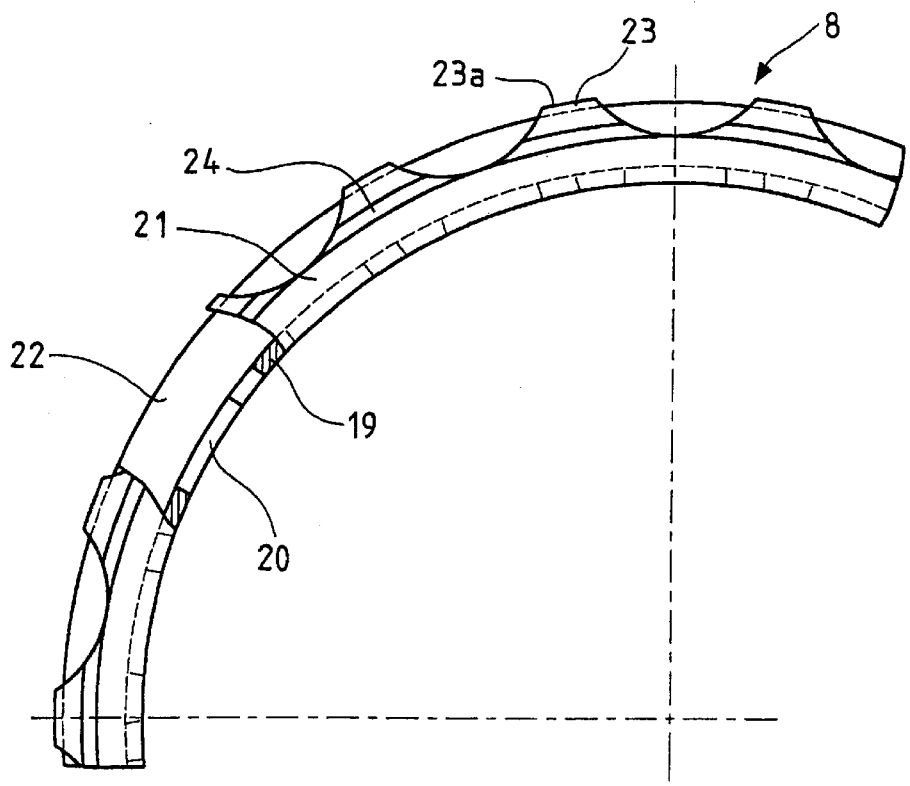

In the relaxed state, shown in FIGS. 2, 3 and 4, the tongues 23 are radial, the free ends 23a having a diameter slightly greater than that of the bore in the outer ring 2, so that on inserting the cage into the outer ring 2, said free ends 23a come into contact with said bore, flex slightly to enter it, and by virtue of their elasticity exert a force tending to move the tongues 23 into a radial plane.

Figure 5:
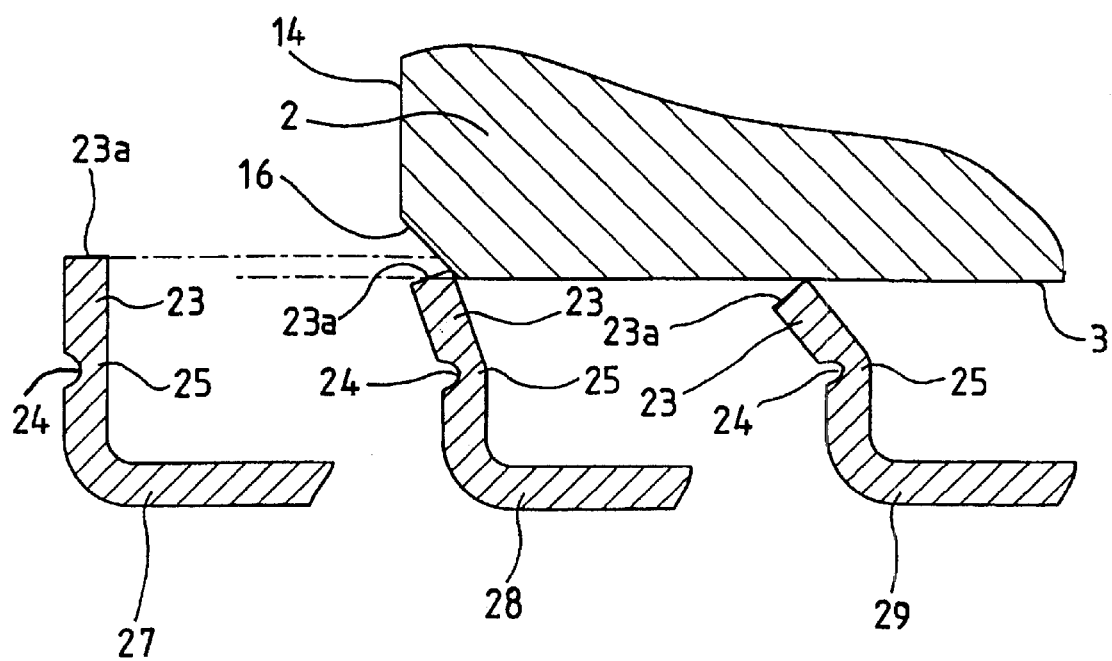
FIG. 5 shows the steps of assembling the cage from FIG. 2.

As can be seen in FIGS. 2, 3 and 4, the substantially radial portion 21 is divided into a plurality of tongues 23 of substantially trapezoidal shape. The cage 8 associated with the spring 6 and with the cams 7 is mounted in the outer ring 2 from the same side as the surface 14. The radial portion 22 is first inserted into the bore of the outer ring 2, and then the cams 7. The position of the cage 27 is then that shown in FIG. 5. The axial movement is continued. The free ends 23a of the tongues 23 come into contact with the bevel 16. Further axial movement deforms the tongues 23, the area 25 flexing to allow inclination of the tongues 23 in a direction opposite to the axial movement with which the cage is inserted, until the outside diameter of the tongues 23 enables them to enter the bore of the outer ring 2. The axial movement continues as far as the position 28 of the cage. The radial portion 22 is then abutted against the radial surface 18 of the shoulder 17, on the opposite side to the substantially radial portion 21. The free ends 23a rub on the bore of the outer ring 2. Any demounting movement in the direction of the surface 14 would jam the tongues 23 with an immediate axial immobilizing effect. The flexing of the tongues has been intentionally exaggerated in FIG. 5 to show this phenomenon more clearly.

The tongues of the cage could of course be directed inward and come into contact with an outside cylindrical surface of an inner ring or a shaft.

A cage could equally be used having a single substantially radial portion from which L-shaped section tongues originate. In the case of a U-shaped section cage, like the cage 8, the other radial portion with no tongues must have some radial play relative to the slideway. The reduction in section in the direction of the axial thickness is provided toward the roots of the tooth-shaped tongues to confer some flexibility on them in the axial direction. The circular groove could be formed in masked time by forming it at the same time as forming the substantially radial portion supporting the tongues. Fabricating the tongues does not entail any supplementary bending operation and is therefore particularly economical.

The freewheel device is therefore economical to manufacture, easy to mount between the two rings or in the outer ring, and achieves effective centering of the cage in or around the cylindrical surface with which it cooperates during and after mounting.

The freewheel device provides effective retention to the cylindrical surface after mounting, thus avoiding any risk of accidental demounting during handling and transport. The benefit of the effect of axial self-immobilization of the cage in the ring in the direction opposite to the mounting direction is reinforced if said ring has axial abutment means such as a shoulder on the side opposite the entry side of the cage. Once the freewheel is in place, it is immobilized axially by mechanical abutment in the direction of the shoulder and by jamming of the tongues of the cage in the slideway in the direction away from the shoulder. The areas of permanent contact between the cage and the cylindrical surface are suitably distributed, whence effective friction fastening of the cage and the member provided with the cylindrical surface. The cage retains a good geometry and limits deformation of the locking tongues, with no unwanted effects on the other functional portions of the cage, in particular the axial portion provided with windows.

Of course, the freewheel device could be equipped with two concentric cages.

Without departing from the scope of the invention, the use of a molded plastics material cage instead of a metal cage could be envisaged.

There is claimed:

1. A freewheel device including at least one cage, a plurality of wedging members retained by said cage, and a member having a cylindrical surface adapted to come into contact with said cage, which cage has an axial portion provided with windows adapted to receive immobilizing members and at least one generally annular and substantially radial portion having a flexing area and a plurality of tongues of substantially radial shape in a relaxed state and adapted to flex in an axial direction so that ends of said tongues are in frictional contact with said cylindrical surface, said ends forming a circumferentially and axially connection means to said surface.

2. The device claimed in claim 1 wherein said flexing area is thinner than the remainder of said substantially radial portion.

3. The device claimed in claim 1 wherein said flexing area is radially between the ends of said tongues and said axial portion.

4. The device claimed in claim 1 wherein said flexing area is in the immediate vicinity of said axial portion in the radial direction.

5. The device claimed in claim 1 wherein said cylindrical surface is a bore of an outer ring or an outside surface of an inner ring or a shaft.

6. The device claimed in claim 1 wherein said tongues are oblique when mounted.

7. The device claimed in claim 1 wherein said tongues prohibit by means of wedging effect axial movement in at least one direction relative to said member having a cylindrical surface in contact with said cage.

8. The device as claimed in claim 2, wherein the thinner flexing area is formed by a groove which extends circumferentially.

9. The device as claimed in claim 1 further comprising a spring strip which is in contact bearing engagement with the axial portion of said cage.

10. A method of manufacturing a cage for a device as claimed in claim 1, wherein said flexing area is formed at the same time as said substantially radial portion.

11. The method claimed in claim 10 wherein said flexing area and said substantially radial portion are formed in the same operation.

* * * * *